Patented Feb. 20, 1934

1,948,299

UNITED STATES PATENT OFFICE 1,948,299

DERIVATIVES OF MONTANE

Michael Jahrstorfer and Hans Georg Hummel, Mannheim, Germany, assignors to I. G. Farbenindustrie Aktiengesellschaft, Frankfort-on-the-Main, Germany No Drawing. Application July 25, 1931, Serial No. 553,231, and in Germany August 2, 1930

13 Claims. (Cl. 260—98)

The present invention relates to the production of dispersing agents especially for the use as wetting, cleansing, emulsifying and like agents.

We have found that valuable dispersing agents are obtained by sulphonating, either alone or in admixture with each other or with other organic substances capable of sulphonation, the different derivatives of the hydrocarbon mixture corresponding to crude montanic acid. The crude montanic acid is no single compound but it consists mainly of montanic acid, $C_{29}H_{58}O_2$, some carboceric acid, $C_{27}H_{54}O_2$ and small quantities of carboxylic acids of an about equally high molecular weight as that of the said two acids. For the sake of brevity the said derivatives of the hydrocarbon mixtures corresponding to crude montanic acid will be referred to in the following description and in the claims as derivatives of montane. By the term "derivatives" we wish to define all the saturated and unsaturated derivatives of the said hydrocarbon mixture corresponding to the beforementioned mixture of acids present in Montan wax, i. e. substitution products of the said hydrocarbons containing about 28 carbon atoms as an average. The said derivatives of montane consequently include the mixtures of carboxylic acids or hydroxy-carboxylic acids and of esters thereof with aliphatic alcohols or especially with cyclic unsaturated alcohols i. e. aliphatic-aromatic alcohols, such as benzyl alcohol, or phenols, the amides of the said mixtures of acids obtainable from the said acids, or from their halides, with the aid of ammonia or amines of aliphatic or, preferably, of aromatic nature, as for example methyl, ethyl, butyl, hexyl or cyclohexyl amines, aniline, toluidine, naphthyl amines and the like. The mixtures of carboxylic acids can be obtained from crude, deresinified or otherwise pretreated Montan wax, for example by wet bleaching with the aid of oxidizing solutions or by distillation. Further derivatives of montane are, for example, the alcohols of high molecular weight or their derivatives obtainable from the said mixture of carboxylic acids, or their derivatives, by reduction by hydrogenation, and the amines. According to the above definition, mixtures of alcohols corresponding to the said mixture will be referred to an montanol, the mixture of acids being broadly defined as a montane carboxylic acid and if unsaturated, specifically as montylene carboxylic acid, and amines as montyl amines.

The initial materials for the preparation of the wetting, cleansing and emulsifying agents may be obtained for example by converting bleached Montan wax, such as can be obtained according to the U. S. Patent No. 1,777,766, granted to one of the present inventors and another, into the methyl esters in any known and convenient manner, the said esters being converted into the amides of the acids by treatment with liquid ammonia or amines containing at least one hydrogen atom connected to a nitrogen atom. Or the chlorine compounds may be prepared by chlorinating the acids by introducing chlorine into the fused acids or into their solutions in inert solvents, such as carbon tetrachloride or carbon disulphide, the chlorine compounds then being treated with aqueous alkalies, if desired, in order to replace the chlorine wholly or partly by hydroxyl groups in a known manner. Unsaturated compounds may also be formed by the splitting off of hydrogen chloride from the chlorination products or by splitting off water wholly or partially from the hydroxy-carboxylic acids in the manner usual for this reaction. If ammonia be employed instead of the alkalies, high molecular amine acids can be obtained by the exchange of chlorine with ammonia. The mixture of fatty acids may also be subjected to hydrogenation as such or after conversion into esters with aliphatic alcohols, such as methyl or ethyl alcohols, whereby alcohols corresponding to the acids are obtained and these may be sulphonated either as such or in the form of their derivatives, as for example their halogen compounds. Halogenated alcohols may be brought into reaction with ammonia or amines, the resulting amino-alcohols being then sulphonated.

The sulphonation of the said initial materials may be effected, for example, by employing concentrated sulphuric acid, oleum, chlorsulphonic acid, sulphur trioxide and like sulphonating agents. It may be carried out in the presence or absence of inert solvents or diluents, such as ethyl ether, chloroform, trichlorethylene or nitrobenzene and/or in the presence of agents removing water, such as phosphorus pentoxide, acetic anhydride, acetyl chloride and the like. It is also advantageous in many cases to employ superficially active catalysts as for example active carbon. The sulphonation may be carried out at room temperature or at lower or higher temperatures, as for example from 10° C. below zero and up to 70° C.; higher temperatures, say up to 120° C. may be also employed but in this case the products may be discolored somewhat. If alcohols or unsaturated initial materials be employed it is advantageous to protract the sulphonation until sulphuric esters primarily formed are converted into sulphonic acids, which result can be ascertained by a sample of the acid reaction mixture being stable to boiling with water and giving a clear solution therewith. In this way sulphonation products are obtained which consist of sulphuric esters ($\equiv$C—O—SO$_3$H), true sulphonic acids ($\equiv$C—SO$_3$H) or a mixture of both. Thus sulphonation products are obtained which are soluble in water or aqueous alkali and possess good foaming properties in acid neutral or alkaline aqueous solutions. The properties of the products vary within wide limits according to the initial materials employed. By mixing the said initial materials with each other or with other substances capable of being sulphonated as for example olefines, alcohols, carboxylic acids or amides, especially those of a molecular weight below that of the montane derivatives, before or after the sulphonation the properties may be further influenced as desired; the said additional substances should, however, contain at least 8 carbon atoms. The sulphonation products may be advantageously employed together with other substances, such as soaps, Turkey red oils, true sulphonic acids of aromatic hydrocarbon, such as naphthalene and its alkyl homologues and the like or water-soluble salts, as for example perborates or Glauber's salt, or protective colloids, such as glue, gelatines, vegetable mucilages, gum arabic and the like. It is frequently advantageous to employ the wetting agents together with organic water-soluble or water-insoluble solvents, such as aliphatic open chain alcohols or cyclohexanol, aliphatic open chain ketones or cyclohexanone, benzine, benzene, trichlor ethylene, and the like.

The products all have a pale color. By reason of their excellent properties they are eminently suitable as wetting, cleansing and dispersing agents, but they may also be employed as dressing and sizing agents and for like impregnating purposes. They are also suitable as additional agents in the preparation of boring and lubricating preparations, polishing preparations from waxes and like dispersions of water-insoluble materials. Several of the products according to the present invention are harder than other impregnating agents hitherto known and therefore constitute a valuable improvement in the technique in the field of auxiliary agents for the textile, leather, paper and other industries.

The following examples will further illustrate the nature of this invention but the invention is not restricted to these examples. The parts are by weight.

Example 1

500 parts of Montain wax bleached according to the U. S. Patent No. 1,777,766 and having a melting point of 83° C. are treated with chlorine for 9 hours until 160 parts of chlorine are absorbed. When cold it is transparent and thickly liquid. This chlorination product is heated for 2 hours at 130° C. under a reflux condenser with four times the amount of a 10 per cent aqueous caustic potash solution. After acidifying with sulphuric acid, an oil separates above the aqueous solution and is dissolved in benzene and removed. After evaporating off the benzene, the oil has the following characteristics:—acid value 126, saponification value 160, iodine value 70.

80 parts of this oil are slowly added to 100 parts of ethyl ether into which 120 parts of chlorsulphonic acid have previously been introduced while cooling. The whole is stirred for several hours at room temperature until a sample dissolves in cold or boiling water to give a clear solution. The product is then poured into a mixture of ice and water, the ether is distilled off and the product neutralized, if desired after removing the excess of sulphuric acid with lime, by means of sodium carbonate or hydroxide. In this manner a very good wetting and emulsifying agent is obtained.

Example 2

25 parts of a Montan carboxylic amide (obtainable by treating Montan wax bleached according to the said Patent No. 1,777,766 with liquid anhydrous ammonia for several hours in a closed tight vessel at 100° C.) are dissolved in 50 parts of pyridine and the solution is introduced into a mixture of 75 parts of pyridine and 25 parts of chlorsulphonic acid which has been prepared while well cooling. The reaction mixture is then heated for several hours to from 75° to 80° C. while stirring until a sample withdrawn is practically soluble in water. The reaction product, which constitutes a sulphamic acid

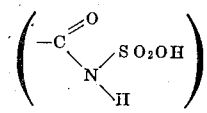

is then added to water while stirring, the solution is filtered from the small amount of impurities and a product is obtained from the filtrate in the form of a pyridine salt, or, after the addition of the calculated amount of caustic soda, as the sodium salt, which is an excellent washing agent.

Example 3

25 parts of chlorsulphonic acid are added to 50 parts of ethyl ether while cooling. A suspension of 20 parts of a mixture of alcohols (obtained by the catalytic hydrogenation of fatty acids obtained by distillation of crude Montan wax) in 100 parts of ethyl ether is then added and the reaction mixture is stirred for several hours at from 25° to 30° C. until a sample is soluble in cold and boiling water. The product is filtered and neutralized with caustic soda. The sodium salt of the sulphonic acid obtained is a very good wetting agent.

Example 4

Deresinified Montan wax is reesterified with ethyl alcohol in any usual and convenient manner and the mixture of montanic ethyl ester and the alcohols contained in the original Montan wax is subjected to hydrogenation in the presence of nickel with the aid of hydrogen at about 150 atmospheres until the montanic ester is converted into the corresponding alcohol, containing about 29 carbon atoms. 10 parts of the reaction products are then stirred into a mixture of 20 parts of acetic anhydride and 25 parts of sulphuric acid monohydrate, prepared while cooling the said agent and the mixture to about 10° C. The reaction mixture is then stirred at 35° C. until a sample gives a clear solution with boiling water, whereupon the reaction product is introduced into a mixture of ice and water, the acetic acid formed being removed, if desired, by distillation. After neutralizing the solution with alkali or with organic bases, such as an ethanol amine, if desired, after removing remainders of sulphuric acid by means of lime the salt obtained may find useful application for impregnating purposes.

Example 5

100 parts of montanol, obtained as described in Example 3, are fused and 25 parts of thionyl chloride are slowly introduced into the melt. The resulting product is shaken in a closed vessel with concentrated aqueous ammonia solution at about 120° C. for from 2 to 3 hours. The resulting mixture of mono-, di- and tri-montyl amines is then sulphonated as described in Example 3, the mixture of amino sulphonic acids obtained being applicable for the same purposes as described in Example 3.

Example 6

Montane carboxylic acid, obtained by the saponification of bleached Montan wax, is esterified with benzyl alcohol in any usual and convenient manner. 50 parts of the resulting benzyl ester are dissolved in 150 parts of trichlor ethylene and the solution is stirred at 10° C. with 30 parts of chlorsulphonic acid. After 2 hours the reaction mixture is slowly poured into a mixture of ice and water and rendered neutral with caustic soda after evaporation of the solvent. After salting out with common salt the aqueous layer is drawn off and the product is freed from water by filtration by suction. The salt of the sulphonic acid obtained forms practically colorless, colloidal solutions with water which are useful for dispersing water-insoluble liquids in water or aqueous solutions and may be also employed as impregnating agents for sizing textile materials.

Example 7

Montane carboxylic acid, obtained by the distillation of Montan wax, is esterified with a commercial mixture of isomeric cresols in any usual and convenient manner. The ester obtained is then sulphonated with chlorsulphonic acid in the presence of trichlor ethylene as described in the foregoing example. After neutralizing the resulting sulphonic acid with the aid of di-ethanolamine, whereby the solvent is evaporated while warming, a practically clear colloidal solution is obtained which may be employed for dispersing water-insoluble solid or liquid bodies or for impregnating purposes.

What we claim is:

1. The process for the production of dispersing agents which comprises acting with a sulphonating agent on a derivative of montane.
2. The process for the production of dispersing agents which comprises acting with a sulphonating agent on a derivative of montane until a sample is stable to boiling with an aqueous mineral acid solution.
3. A sulphonated derivative of montane.
4. A sulphonated oxygen-bearing derivative of montane.
5. A sulphonated ester of montane carboxylic acid.
6. A sulphonated ester of montane carboxylic acid with a mono cyclic alcohol.
7. A sulphonated hydroxy-montane carboxylic acid.
8. A sulphonated mixture of montylene carboxylic acid and hydroxy-montane carboxylic acid.
9. A sulphonated ester of hydroxy-montane carboxylic acid.
10. A sulphonated montanol.
11. A sulphonic acid of a derivative of montane.
12. A mixture of sulphuric esters and sulphonic acids of an oxygen-bearing derivative of montane.
13. A mixture of sulphuric esters and sulphonic acids of montane carboxylic acids.

MICHAEL JAHRSTORFER.
HANS GEORG HUMMEL.